(12) United States Patent
Hack et al.

(10) Patent No.: US 10,225,361 B2
(45) Date of Patent: Mar. 5, 2019

(54) CONTENT MANAGEMENT IN CACHING SERVICES

(71) Applicant: INTERNATIONAL BUSINESS MACHINES CORPORATION, Armonk, NY (US)

(72) Inventors: Michel Hack, Cortlandt Manor, NY (US); Yufei Ren, Somers, NY (US); Yandong Wang, Elmsford, NY (US); Li Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 15/196,880

(22) Filed: Jun. 29, 2016

(65) Prior Publication Data

US 2018/0007158 A1 Jan. 4, 2018

(51) Int. Cl.
*H04L 29/08* (2006.01)
*H04L 12/26* (2006.01)
(Continued)

(52) U.S. Cl.
CPC ...... *H04L 67/2842* (2013.01); *G06F 12/0808* (2013.01); *G06F 12/0811* (2013.01);
(Continued)

(58) Field of Classification Search
CPC ............. G06F 12/0862; G06F 12/0875; G06F 2212/602; G06F 12/0893; G06F 12/0811; G06F 2212/608; G06F 2212/62; G06F 12/0815; G06F 2212/60; G06F 12/0808; G06F 12/0897; G06F 2212/1024; G06F 2212/6026; H04L 67/2852; H04L 67/2842
(Continued)

(56) References Cited

U.S. PATENT DOCUMENTS

| 5,729,710 A | 3/1998 | Magee et al. |
| 7,117,262 B2 | 10/2006 | Bai et al. |

(Continued)

OTHER PUBLICATIONS

Venkataramani (The potential costs and benefits of long-term prefetching for content distribution, 2002).*
(Continued)

*Primary Examiner* — Chris Parry
*Assistant Examiner* — Weiwei Stiltner
(74) *Attorney, Agent, or Firm* — F. Chau & Associates, LLC

(57) ABSTRACT

A caching management method includes embedding a notification request tag in a dummy file, uploading the dummy file to a cache server, recording a timestamp indicating a first point in time that the dummy file is uploaded to the cache server, receiving an eviction notification indicating a second point in time that the dummy file is evicted from the cache server, and calculating an eviction time indicating an amount of time taken for the dummy file to be evicted from the cache server. Transmission of the eviction notification is triggered in response to processing the notification request tag, and the dummy file is not retrieved from the cache server between the first point in time and the second point in time. The eviction time is equal to a difference between the first point in time and the second point in time.

20 Claims, 13 Drawing Sheets

(51) Int. Cl.

| | |
|---|---|
| *G06F 12/0893* | (2016.01) |
| *G06F 12/0897* | (2016.01) |
| *G06F 12/0875* | (2016.01) |
| *G06F 12/0811* | (2016.01) |
| *G06F 12/0862* | (2016.01) |
| *G06F 12/0808* | (2016.01) |
| *G06F 12/0815* | (2016.01) |

(52) U.S. Cl.
CPC ...... *G06F 12/0815* (2013.01); *G06F 12/0862* (2013.01); *G06F 12/0875* (2013.01); *G06F 12/0893* (2013.01); *G06F 12/0897* (2013.01); *H04L 43/0852* (2013.01)

(58) Field of Classification Search
USPC ........................................................ 709/213
See application file for complete search history.

(56) References Cited

U.S. PATENT DOCUMENTS

| | | |
|---|---|---|
| 8,675,648 B1 | 3/2014 | Goel et al. |
| 8,700,005 B1 | 4/2014 | Kiraly et al. |
| 9,160,805 B2 | 10/2015 | Yoo et al. |
| 2003/0115281 A1 | 6/2003 | McHenry et al. |
| 2008/0293450 A1 | 11/2008 | Ryan et al. |
| 2009/0168795 A1 | 7/2009 | Segel |

OTHER PUBLICATIONS

Pandey (A Framework for Predictive Web Prefetching at the Proxy Level using Data Mining, 2008).*

Sem Borst, et al., "Distributed Caching Algorithms for Content Distribution Networks," IEEE INFOCOM 2010 Proceedings, pp. 1-9.

Jianliang Xu, et al., "Caching and Prefetching for Web Content Distribution," Computing in Science and Engineering, pp. 54-59, Jul./Aug. 2004, IEEE Proceedings.

* cited by examiner

CONTENT MANAGEMENT IN CACHING SERVICES

TECHNICAL FIELD

Exemplary embodiments of the inventive concept relate to a caching management method and system.

DISCUSSION OF RELATED ART

Content providers serve content through content delivery networks (CDN) to end users. Retrieving content directly from content providers may be expensive and slow. Caching, pre-fetching, pre-caching, etc. may be used so that users can access the content at lower latency. Thus, the content may be pushed to cache servers, which are able to provide content at lower latency because of closer geographic proximity, better hardware, etc. When users request content that is not available on the cache servers, the content provider typically serves the content directly at a higher latency. To optimally determine what content to push and when, some form of content and/or caching management may be used. Further, caching management may determine how long the content should remain on the cache server.

Popular, often-requested content may be designated as hot content, while other content may be designated as cold content. Prior solutions for caching management have included, for example, deciding beforehand (in a static manner) what content to cache or caching a fixed amount of content based on capacity of the cache server. However, new hot content may not be cached on time, old cold content might still take up space in the cache server, and the cache server may evict content just because it has reached capacity. Moreover, there is no coordination between the content provider and the cache server, and caching management does not adapt to changing access patterns for content.

SUMMARY

Exemplary embodiments of the inventive concept provide a caching management method that includes embedding a notification request tag in a dummy file, uploading the dummy file to a cache server, recording a timestamp indicating a first point in time that the dummy file is uploaded to the cache server, receiving an eviction notification indicating a second point in time that the dummy file is evicted from the cache server, and calculating an eviction time indicating an amount of time taken for the dummy file to be evicted from the cache server. Transmission of the eviction notification is triggered in response to processing the notification request tag, and the dummy file is not retrieved from the cache server between the first point in time and the second point in time. The eviction time is equal to a difference between the first point in time and the second point in time.

According to an exemplary embodiment of the inventive concept, the method further includes determining an average inter-request time of an actual file, comparing the average inter-request time to the eviction time, and uploading the actual file to the cache server when the average inter-request time is smaller than the eviction time. The average inter-request time is equal to an average amount of time that passes between consecutive requests for the actual file.

According to an exemplary embodiment of the inventive concept, the dummy file may be a dummy webpage, and the actual file may be an actual webpage.

The method may further include aborting uploading the actual file to the cache server when the average inter-request time is larger than the eviction time.

According to an exemplary embodiment of the inventive concept, the dummy file is uploaded to the cache server by a content provider server, the eviction notification is transmitted to the content provider server by the cache server in response to the cache server processing the notification request tag, the average inter-request time is determined by the content provider server, the average inter-request time is compared to the eviction time by the content provider server, uploading the actual file to the cache server is performed by the content provider server, and aborting uploading the actual file to the cache server is performed by the content provider server.

According to an exemplary embodiment of the inventive concept, the method further includes, determining an average inter-request time of an actual file, comparing the average inter-request time to an average request frequency of all files stored in the cache server, and uploading the actual file to the cache server when the average inter-request time is within a predetermined deviation range of the average request frequency. The average inter-request time is equal to an average amount of time that passes between consecutive requests for the actual file. The average request frequency is indicated by the eviction notification.

The method may further include aborting uploading the actual file to the cache server when the average inter-request time is not within the predetermined deviation range of the average request frequency.

According to an exemplary embodiment of the inventive concept, the dummy file is uploaded to the cache server by a content provider server, the eviction notification is transmitted to the content provider server by the cache server in response to the cache server processing the notification request tag, the average inter-request time is determined by the content provider server, the average inter-request time is compared to the average request frequency by the content provider server, uploading the actual file to the cache server is performed by the content provider server, and aborting uploading the actual file to the cache server is performed by the content provider server.

According to an exemplary embodiment of the inventive concept, the method further includes determining an average inter-request time of an actual file, comparing the average inter-request time to an average request frequency of files stored in the cache server that are at a predetermined percentile of all files stored in the cache server with relation to access frequency, and uploading the actual file to the cache server when the average inter-request time is within a predetermined deviation range of the average request frequency. The average inter-request time is equal to an average amount of time that passes between consecutive requests for the actual file. The average request frequency is indicated by the eviction notification.

The method may further include aborting uploading the actual file to the cache server when the average inter-request time is not within the predetermined deviation range of the average request frequency.

According to an exemplary embodiment of the inventive concept, the dummy file may be periodically uploaded to the cache server at a predetermined interval.

Exemplary embodiments of the inventive concept provide a caching management method that includes embedding a notification request tag in dummy data, transmitting the dummy data from a backend data store to a frontend data cache, recording a timestamp indicating a first point in time that the dummy data is transmitted to the frontend data cache, receiving an eviction notification indicating a second point in time that the dummy data is evicted from the frontend data cache, and calculating an eviction time indicating an amount of time taken for the dummy data to be evicted from the frontend data cache. The backend data store stores compressed data and the frontend data cache stores uncompressed data. Transmission of the eviction notification is triggered in response to processing the notification request tag, and the dummy data is not retrieved from the frontend data cache between the first point in time and the second point in time. The eviction time is equal to a difference between the first point in time and the second point in time.

According to an exemplary embodiment of the inventive concept, the method further includes determining an average inter-request time of actual data, comparing the average inter-request time to the eviction time, and transmitting the actual data to the frontend data cache when the average inter-request time is smaller than the eviction time. The average inter-request time is equal to an average amount of time that passes between consecutive requests for the actual data.

The method may further include aborting transmitting the actual data to the frontend data cache when the average inter-request time is larger than the eviction time.

According to an exemplary embodiment of the inventive concept, the method further includes determining an average inter-request time of actual data, comparing the average inter-request time to an average request frequency of all data stored in the frontend data cache, and transmitting the actual data to the frontend data cache when the average inter-request time is within a predetermined deviation range of the average request frequency. The average inter-request time is equal to an average amount of time that passes between consecutive requests for the actual data. The average request frequency is indicated by the eviction notification.

The method may further include aborting transmitting the actual data to the frontend data cache when the average inter-request time is not within the predetermined deviation range of the average request frequency.

According to an exemplary embodiment of the inventive concept, the method further includes determining an average inter-request time of actual data, comparing the average inter-request time to an average request frequency of data stored in the frontend data cache that is at a predetermined percentile of all data stored in the frontend data cache with relation to access frequency, and transmitting the actual data to the frontend data cache when the average inter-request time is within a predetermined deviation range of the average request frequency. The average inter-request time is equal to an average amount of time that passes between consecutive requests for the actual data. The average request frequency is indicated by the eviction notification.

The method may further include aborting transmitting the actual data to the frontend data cache when the average inter-request time is not within the predetermined deviation range of the average request frequency.

According to an exemplary embodiment of the inventive concept, the dummy data is periodically transmitted to the frontend data cache at a predetermined interval.

Exemplary embodiments of the inventive concept provide a caching management system that includes a backend data store configured to store compressed data, a frontend data cache configured to store uncompressed data, a memory storing a computer program, and a processor configured to execute the computer program. The frontend data cache is operatively coupled to the backend data store. The computer program is configured to embed a notification request tag in dummy data, transmit the dummy data from the backend data store to the frontend data cache, record a timestamp indicating a first point in time that the dummy data is transmitted to the frontend data cache, transmit an eviction notification indicating a second point in time that the dummy data is evicted from the frontend data cache, and calculate an eviction time indicating an amount of time taken for the dummy data to be evicted from the frontend data cache. Transmission of the eviction notification is triggered in response to processing the notification request tag, and the dummy data is not retrieved from the frontend data cache between the first point in time and the second point in time. The eviction time is equal to a difference between the first point in time and the second point in time.

BRIEF DESCRIPTION OF THE DRAWINGS

The above and other features of the inventive concept will become more apparent by describing in detail exemplary embodiments thereof, with reference to the accompanying drawings, in which.

DETAILED DESCRIPTION

Figure 1:
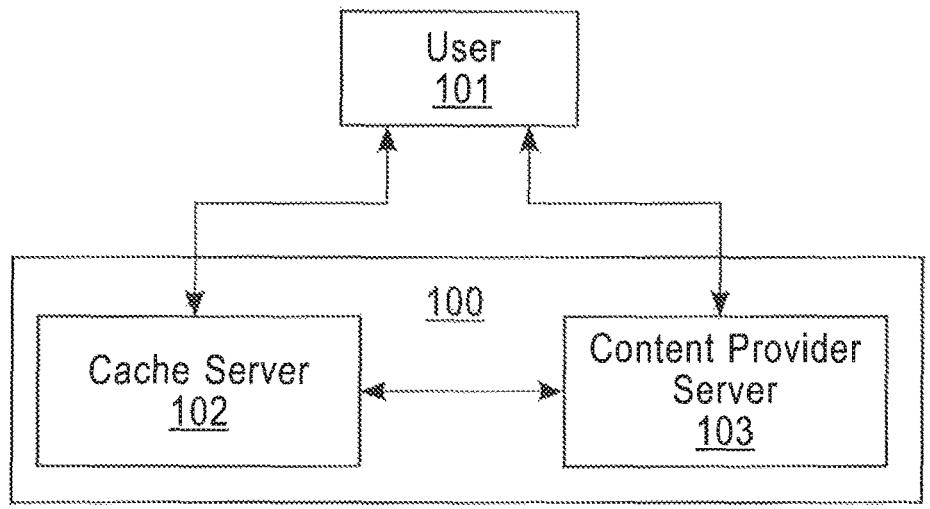
FIG. 1 illustrates a caching management system including a cache server and a content provider server according to an exemplary embodiment of the inventive concept.

Content providers serve a variety of content to end users or clients and the content may include news, information, documents streaming video, images, other media, etc. Directly retrieving content from the content providers may be slow and/or expensive because, for example, the geographical location may be far from the user or a complicated database query needs to be executed.

As such, content providers may pay for content delivery services or content delivery networks (CDN) that can cache content, so that users can access it at greater speed. CDNs provide parallel, independent caching services and well-known content delivery networks include AKAMAI, ALCATEL-LUCENT VELOCIX, AMAZON CLOUD-FRONT, CACHEFLY, CLOUDFLARE, LEVEL 3, RACK-SPACE CLOUD FILES, etc. CDNs may be significantly faster than the content providers because of worldwide distribution of geographical locations, better hardware, more resources, etc.

However, in addition to costing money, the amount of cache space/memory/storage of a cache server allocated to the content provider is normally insufficient to host all of the content provider's data. Therefore, the content provider must make a determination of what content is hot (as opposed to cold) and popular for its users and push that content to the cache server.

Determination of the "hotness" of content may be highly subjective. For example, a content provider of news may decide to push all front page headline news or all news of a certain subject matter to the cache server. As another example, a content provider may rank content by the number of requests in the past week and push the top 10% to the cache server. But access patterns, and thus actual hotness/coldness of content, may change quickly. Prior solutions that involve static decisions or rules on what to push to cache are typically insufficient, because the content provider can only hope that it pushed the correct content based on a subjective inquiry.

Therefore, given the limited storage of cache servers, a caching management method should make the best use of cache servers. Generally, content pushed to the cache server should be hotter than the cold content on the cache server. Pushing the wrong (cold) content to the cache server will lead to inefficient use of cache space. Cache servers typically make their own decisions on what to evict from the cache based on cache algorithms such as Least Recently Used (LRU). The LRU algorithm will evict content that has not been accessed for the longest period of time. The wrong content pushed to the cache server will have to spend time moving through the LRU list to be evicted, leading to an undesirable situation where cold content resides on the cache server and hot content remains on the content provider server waiting to be pushed.

Exemplary embodiments of the inventive concept provide a light-weight caching management method for content providers to manage CDN cache space efficiently. A probing request is sent by uploading a small, unique, dummy webpage to the cache server. The dummy webpage is a silent item, in that no user will access the dummy webpage during its time in the cache server. The dummy webpage may be embedded with a special notification request tag so that upon eviction of the dummy webpage, an eviction time (or cache resident time) may be estimated. This eviction time may be compared to an average request interval of some content on the content provider. If the average request interval is greater than the eviction time, then it is not worth pushing the content to the cache server because it will be evicted before the next access. Other metrics, such as average request frequency of content on the cache server, may also be used to determine what content to push to the cache.

The inventive concept allows for more intelligent control and coordination of the flow of information and data from content providers to cache servers. The content provider knows what content to push and when, and can automatically adjust to changing request patterns.

Furthermore, the inventive concept may be applied to CDNs deployed in any kind of operating system. Not only is the inventive concept applicable to cloud computing environments and networking systems, it can also be applied to other caching systems. For example, the caching management method may be applied to embedded systems with a fast frontend cache and a backend store with compressed, block based, or other specially-designed storage.

Exemplary embodiments of the inventive concept will be described more fully hereinafter with reference to the accompanying drawings. Like reference numerals may refer to like elements throughout the specification and drawings.

For convenience of explanation, exemplary embodiments of the inventive concept are described herein in which a dummy webpage and an actual webpage are uploaded from a content provider server to a cache server. However, exemplary embodiments of the inventive concept are not limited thereto. In exemplary embodiments of the inventive concept, data other than webpages may be utilized. For example, rather than webpages, dummy and actual files (e.g., media files, documents, text, graphics, software, scripts, etc.) may be uploaded from the content provider server to the cache server.

FIG. 1 illustrates a caching management system including a cache server and a content provider server according to an exemplary embodiment of the inventive concept.

Referring to FIG. 1, a caching management system 100 may include a cache server 102 and a content provider server 103. The cache server 102 and the content provider server 103 are connected with each other. The cache server 102 may be a part of a content delivery network (CDN).

A user 101 may request content from either the cache server 102 or the content provider server 103. Content may include webpages, documents, streaming video, etc. The content provider server 103 pushes content to the cache server 102. According to an exemplary embodiment of the inventive concept, content requested by the user 101 may be provided by the cache server 102, and if the content is unavailable at the cache server 102, the content may be provided to the user 101 by the content provider server 103.

Figure 2:
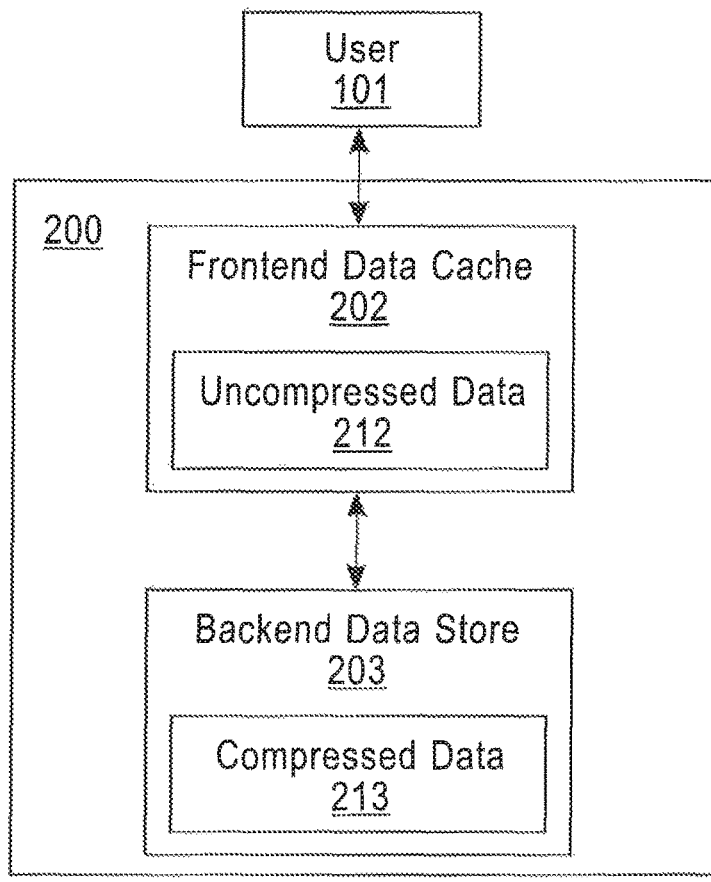
FIG. 2 illustrates a caching management system including a frontend data cache and a backend data store according to an exemplary embodiment of the inventive concept.

FIG. 2 illustrates a caching management system including a frontend data cache and a backend data store according to an exemplary embodiment of the inventive concept.

Referring to FIG. 2, a caching management system 200 may include a frontend data cache 202 and a backend data store 203. The frontend data cache 202 may be configured to store uncompressed data 212 and the backend data store 203 may be configured to store compressed data 213. According to an exemplary embodiment of the inventive concept, the backend data store 203 may be configured with block based or other specially-designed storage. Additionally, operation of the frontend data cache 202 may be faster than operation of the backend data store 203.

The frontend data cache 202 is operatively coupled to the backend data store 203. The frontend data cache 202 and the backend data store 203 may be embedded as system components within a complex caching system. For example, in a computer system, memory may be configured as the frontend data cache 202 and a hard disk may be configured as the backend data store 203.

The backend data store 203 may push a portion of the compressed data 213, which is subsequently uncompressed, to the frontend data cache 202 to be stored as the uncompressed data 212. The user 101 may request content from among the uncompressed data 212 in the frontend data cache 202. According to an exemplary embodiment of the inventive concept, content requested by the user 101 may be provided by the frontend data cache 202, and if the content is unavailable at the frontend data cache 202, the backend data store 203 may push the requested content to the frontend data cache 202 so that the user 101 can access it.

Figure 3:
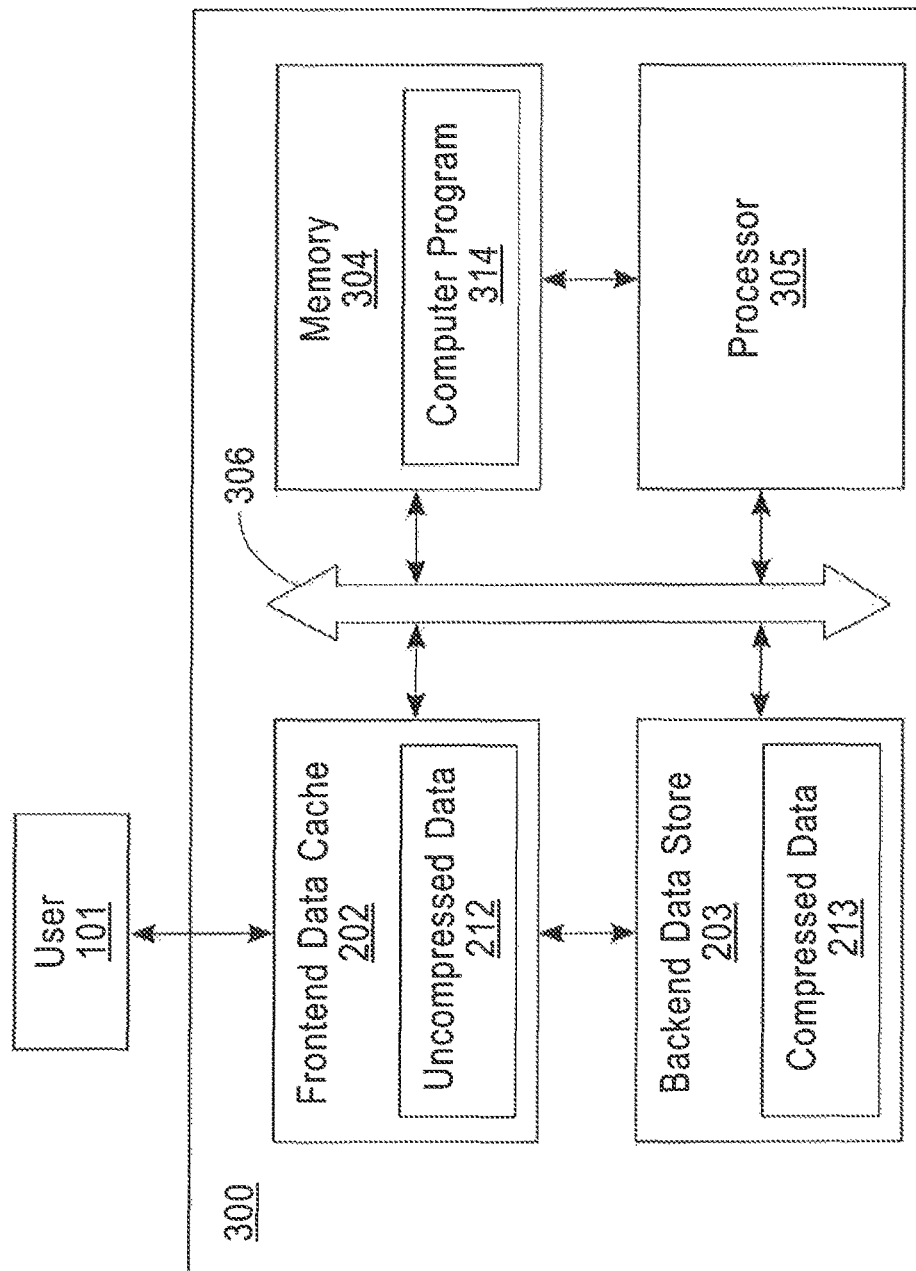
FIG. 3 illustrates a caching management system including a frontend data cache, a backend data store, a memory, and a processor according to an exemplary embodiment of the inventive concept.

FIG. 3 illustrates a caching management system including a frontend data cache, a backend data store, a memory, and a processor according to an exemplary embodiment of the inventive concept.

Referring to FIG. 3, a caching management system 300 may include the frontend data cache 202, the backend data store 203, a memory 304, a processor 305, and a bus 306. The frontend data cache 202 and the backend data store 203 are configured in a similar manner to that described with reference to FIG. 2. The frontend data cache 202, the backend data store 203, the memory 304, and the processor 305 are all connected to the bus 306 such that the components may communicate with one another. The memory 304 may store a computer program 314 and the processor 305 may be configured to execute the computer program 314.

The computer program 314 is configured to perform operations for a cache management method, which will be described in detail below with reference to at least FIGS. 4 and 5.

As described above with respect to FIG. 2, the user 101 may request and access content from the frontend data cache 202.

Figure 4:
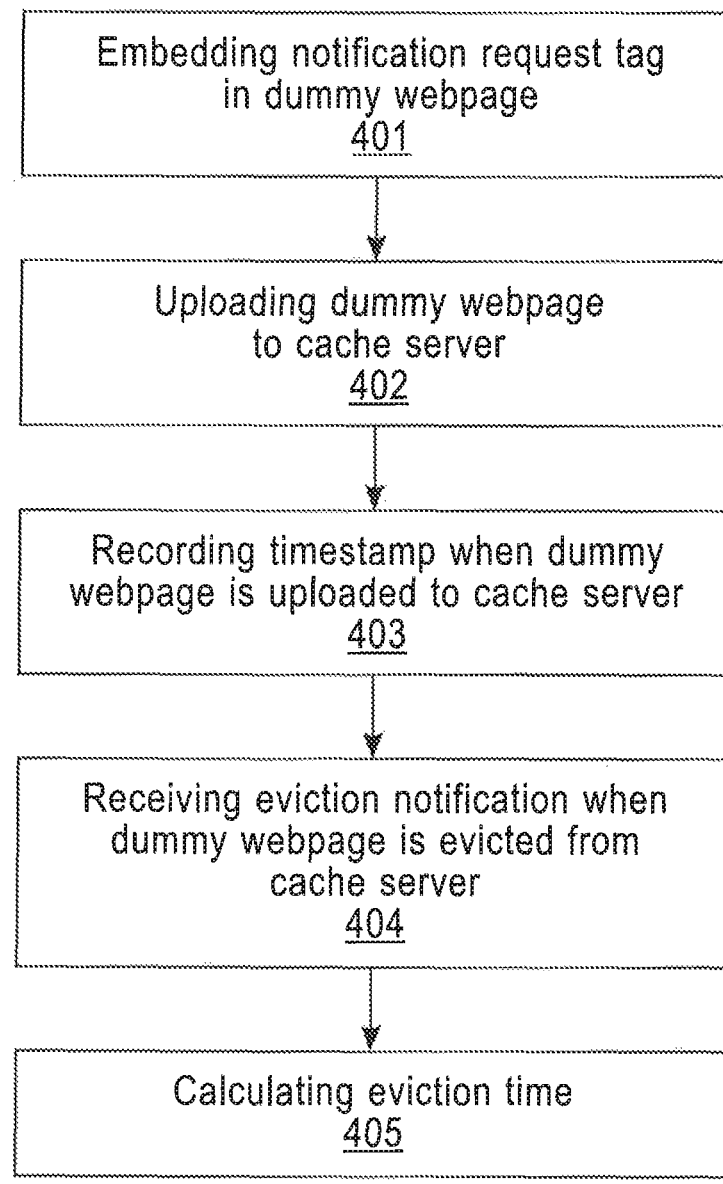
FIG. 4 illustrates a caching management method for a cache server according to an exemplary embodiment of the inventive concept.

FIG. 4 illustrates a caching management method for a cache server according to an exemplary embodiment of the inventive concept. The caching management method may also be referred to as a probing request.

Referring to FIG. 4, a notification request tag is embedded in a dummy webpage (operation 401). In this case, the dummy webpage may be, for example, a blank webpage with a special URL that a user would not or cannot access (e.g., a deliberately cold webpage). The notification request tag may be embedded as metadata, a single bit (e.g., set to 1), etc. The dummy webpage is uploaded to a cache server (operation 402). A timestamp is recorded at a first point in time when the dummy webpage is uploaded to the cache server (operation 403).

After a period of time, the dummy webpage may be evicted from the cache server based on a cache algorithm, e.g., LRU. An eviction notification (e.g., a message), which indicates a second point in time when the dummy webpage is evicted from the cache server, is received (operation 404). In other words, as intended, the dummy webpage is not retrieved from the cache server between the first point in time and the second point in time, and will be evicted. At the time of eviction, the notification request tag embedded in the dummy webpage is processed. Transmission of the eviction notification is triggered in response to the processing of the notification request tag.

An eviction time is calculated (operation 405). The eviction time is the amount of time taken for the dummy webpage to be evicted from the cache server. In other words, the eviction time is equal to the difference between the first point in time and the second point in time. The eviction time may also be referred to as a cache resident time.

Figure 5:
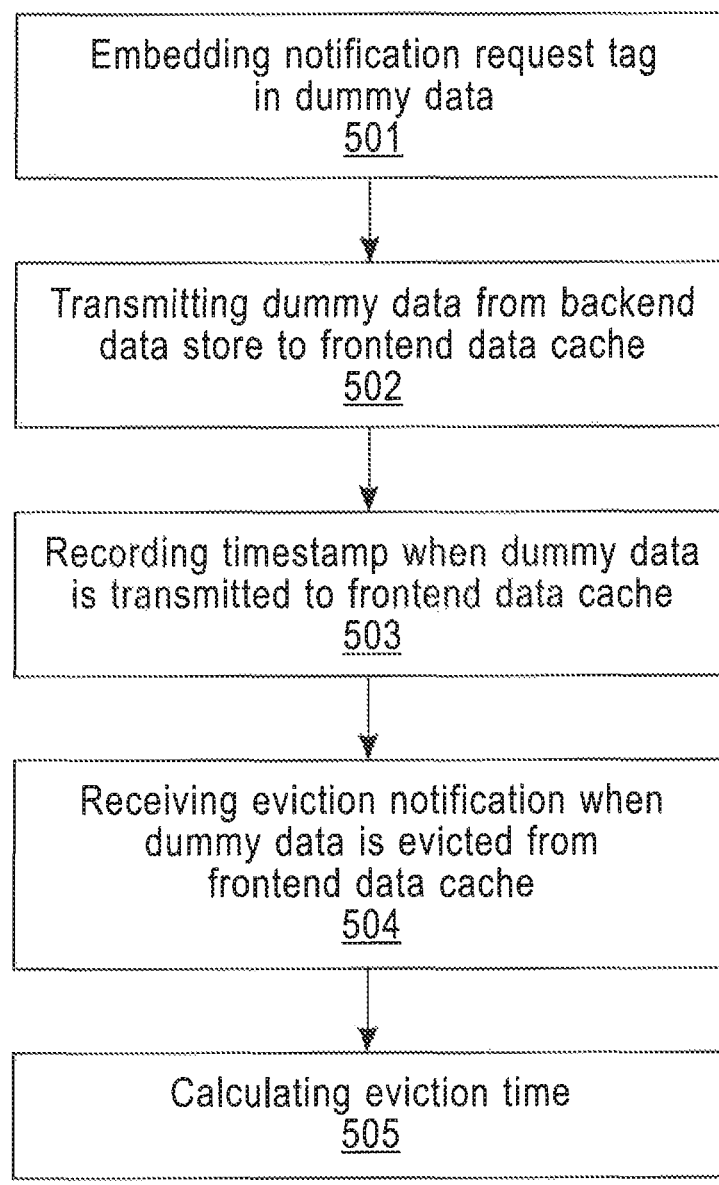
FIG. 5 illustrates a caching management method for a frontend data cache according to an exemplary embodiment of the inventive concept.

FIG. 5 illustrates a caching management method for a frontend data cache according to an exemplary embodiment of the inventive concept.

Referring to FIG. 5, a notification request tag is embedded in dummy data (operation 501). In this case, the dummy data may be, for example, an empty and/or very small file that a user would not or cannot access. The notification request tag may be embedded as metadata, a single bit (e.g., set to 1), etc. The dummy data is transmitted from a backend data store to a frontend data cache (operation 502). A timestamp is recorded at a first point in time when the dummy data is transmitted to the frontend data cache (operation 503).

After a period of time, the dummy data may be evicted from the frontend data cache based on a cache algorithm, e.g., LRU. An eviction notification, which indicates a second point in time when the dummy data is evicted from the frontend data cache, is received (operation 504). In other words, as intended, the dummy data is not retrieved from the frontend data cache between the first point in time and the second point in time, and will be evicted. At the time of eviction, the notification request tag embedded in the dummy data is processed. Transmission of the eviction notification is triggered in response to the processing of the notification request tag.

An eviction time is calculated (operation 505). The eviction time is the amount of time taken for the dummy data to be evicted from the frontend data cache. In other words, the eviction time is equal to the difference between the first point in time and the second point in time.

Figure 6:
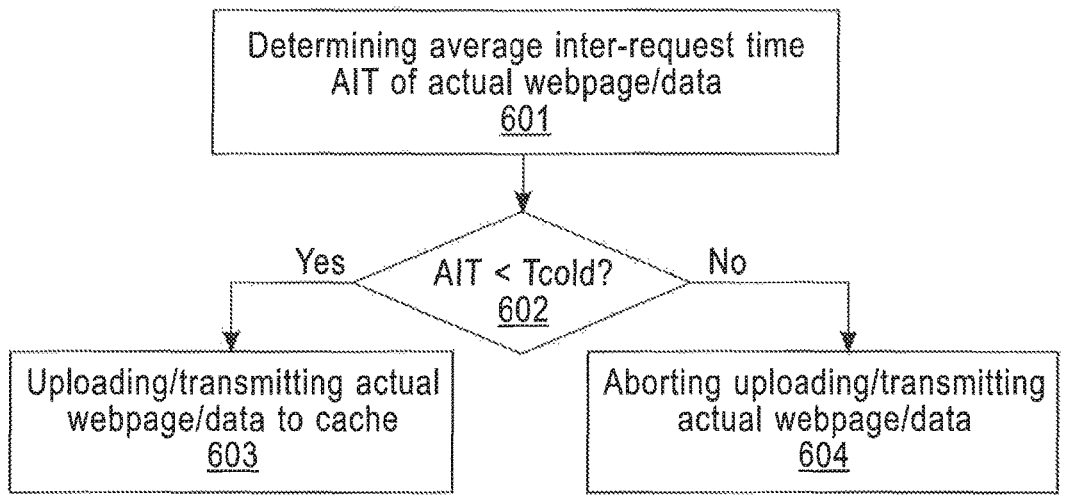
FIGS. 6-8 are flowcharts illustrating additional operations of the caching management methods of FIGS. 4 and 5 according to exemplary embodiments of the inventive concept.
Figure 7:
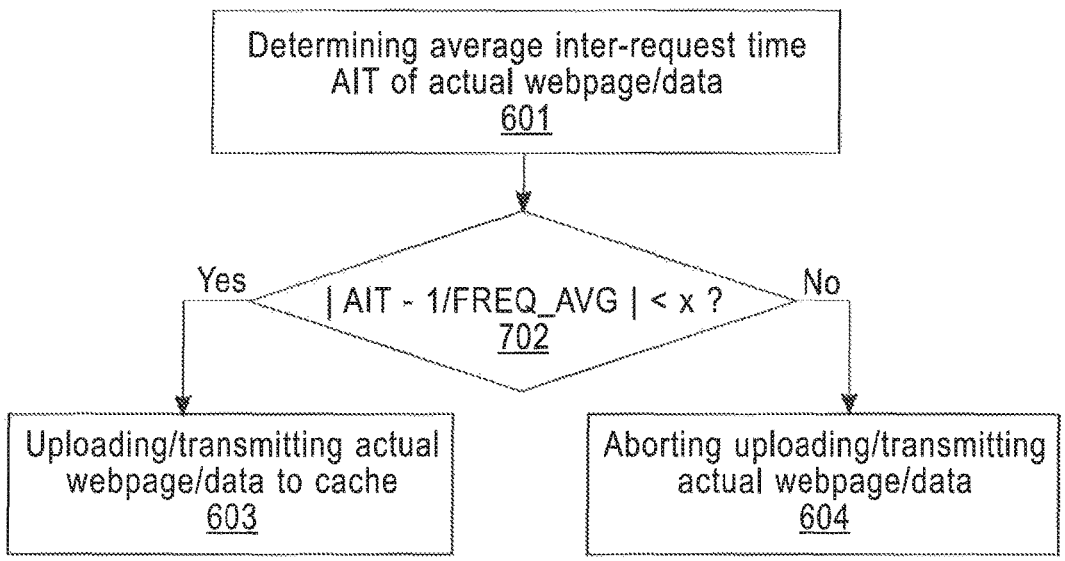
Figure 8:
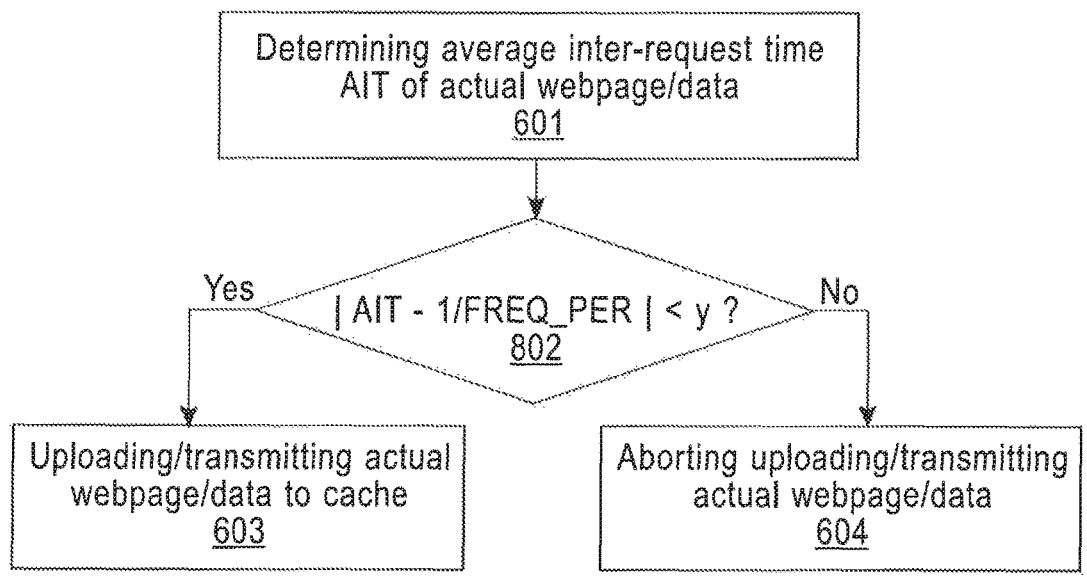

FIGS. 6-8 are flowcharts illustrating additional operations of the caching management methods of FIGS. 4 and 5 according to exemplary embodiments of the inventive concept.

With respect to the operations illustrated in FIGS. 6-8, they may be included in the caching management method of either FIG. 4 or 5.

Referring to FIG. 6, an average inter-request time AIT of an actual webpage (or actual data) is determined (operation 601). For example, an actual webpage is a webpage that would and can be accessed by users during normal course of operation (as opposed to the dummy webpage). Similarly, actual data is data that users would and can access under normal operation, e.g., a streaming movie, a document, an image, etc. The average inter-request time AIT is equal to an average amount of time that passes between consecutive requests for the actual webpage (or actual data). AIT may be from the perspective of the content provider server, or the backend data store. For example, AIT may represent the average amount of time that passes between consecutive requests for an actual webpage stored in the content provider server or the average amount of time that passes between consecutive requests for actual data stored in the backend data store. The actual webpage may be a webpage designated as hot. As an example, assuming that, in a span of time, the actual webpage is requested three times and the time that passes between consecutive requests is 2 and 20 seconds, the average inter-request time AIT would be 11 seconds.

The average inter-request time AIT may be continuously calculated over time to adjust AIT and keep AIT up to date. Additionally, AIT may be calculated through a variety of methods. For example, outlier values may be removed prior to calculating the average or AIT may represent the median inter-request time. Accordingly, the average inter-request time AIT may accurately reflect changing access patterns.

AIT is compared to the eviction time, as described with reference to FIGS. 4 and 5 and hereinafter referred to as Tcold (operation 602). If AIT is less than Tcold, the actual webpage is uploaded to cache (operation 603). If AIT is greater than or equal to Tcold, the actual webpage is not uploaded to the cache; in other words, the upload is aborted (operation 604). Using the example above and assuming Tcold is 10 seconds, the actual webpage would not be uploaded to the cache because AIT (11 seconds) is greater than Tcold (10 seconds). The rationale behind this process is that it is not worthwhile to upload the actual webpage to the cache if it will be evicted from the cache before a user requests it.

Referring to FIG. 7, operations 601, 603, and 604 are substantially the same as those described with reference to FIG. 6. Instead of operation 602, AIT is compared to an average request frequency FREQ_AVG of all webpages stored in the cache server (or all data stored in the frontend data cache) (operation 702). FREQ_AVG may be from the cache's perspective and may be measured by the cache server (or the frontend data cache). For example, FREQ_AVG may represent the average number of requests per second for all webpages/data stored in the cache server/frontend data cache. The average request frequency FREQ_AVG is indicated by the eviction notification. In other words, FREQ_AVG may be stored in, attached with, or embedded in the eviction notification along with Tcold. Software may be installed on the cache server/frontend data cache to enable it to calculate FREQ_AVG and provide FREQ_AVG in the eviction notification. Furthermore, the eviction notification may be configured to carry extra information in addition to Tcold and FREQ_AVG.

If AIT is within a predetermined deviation range of FREQ_AVG, e.g., $|AIT-1/FREQ\_AVG|<x$, operation 603 is performed. If not, operation 604 is performed. FREQ_AVG may represent, for example, requests per second. If AIT is within the predetermined deviation range, the actual webpage (or actual data) has a request frequency sufficiently close to the average request frequency of webpages (or data) in the cache server (or the frontend data cache), and thus it may be worthwhile to push the actual webpage (or actual data) to the cache.

Referring to FIG. 8, operations 601, 603, and 604 are substantially the same as those described with reference to FIG. 6. Instead of operation 602, AIT is compared to an average request frequency FREQ_PER of webpages stored in the cache server (or data stored in the frontend data cache) that are at a predetermined percentile of all webpages stored in the cache server (or data stored in the frontend data cache) with relation to access frequency (operation 802). For example, the average request frequency FREQ_PER may be obtained for webpages (or data) at the $90^{th}$ percentile with relation to access frequency, so that request frequencies for popular pages (or data) are used to calculate FREQ_PER. FREQ_PER may be from the cache server's/frontend data cache's perspective and may be measured by the cache server/frontend data cache.

The average request frequency FREQ_PER is indicated by the eviction notification. In other words, the average request frequency FREQ_PER may be stored in, attached with, or embedded in the eviction notification along with Tcold. Software may be installed on the cache server/frontend data cache to enable it to calculate FREQ_PER and provide FREQ_PER in the eviction notification. Furthermore, the eviction notification may be configured to carry extra information in addition to Tcold and FREQ_PER.

If AIT is within a predetermined deviation range of FREQ_PER, e.g., $|AIT-1/FREQ\_PER|<y$, operation 603 is performed. If not, operation 604 is performed. FREQ_PER may represent, for example, requests per second. If AIT is within the predetermined deviation range, the actual webpage (or actual data) is deemed sufficiently popular or hot enough to be pushed to the cache server (or the frontend data cache).

Regarding the operations described with reference to FIGS. 4 and 6-8, according to an exemplary embodiment of the inventive concept, a content provider server may contribute to their performance. For example, the dummy webpage may be uploaded by the content provider server, the eviction notification may be transmitted to the content provider server, the average inter-request time AIT may be determined by the content provider server, AIT may be compared to the Tcold/FREQ_AVG/FREQ_PER by the content provider server, the actual webpage may be uploaded by the content provider server, and uploading of the actual webpage may be aborted by the content provider server.

According to an exemplary embodiment of the inventive concept, with reference to FIGS. 6 to 8, the eviction notification may be configured to carry Tcold, FREQ_AVG, and/or FREQ_PER, as well as other information.

Figure 9A:
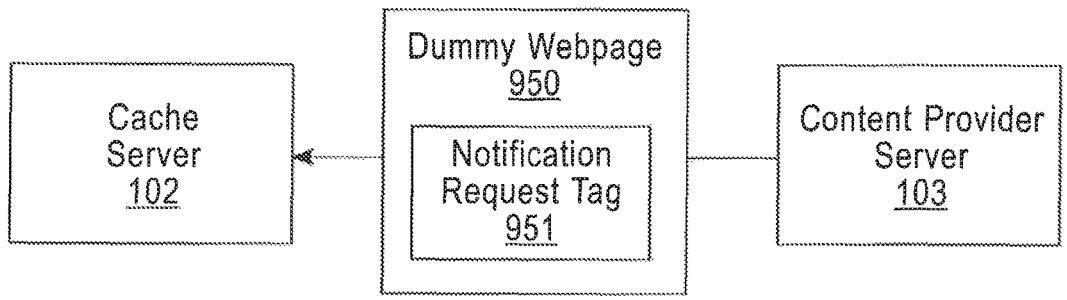
FIGS. 9A and 9B are block diagrams depicting the interaction between a cache server and a content provider server according to the caching management method of FIG. 4, according to an exemplary embodiment of the inventive concept.
Figure 9B:
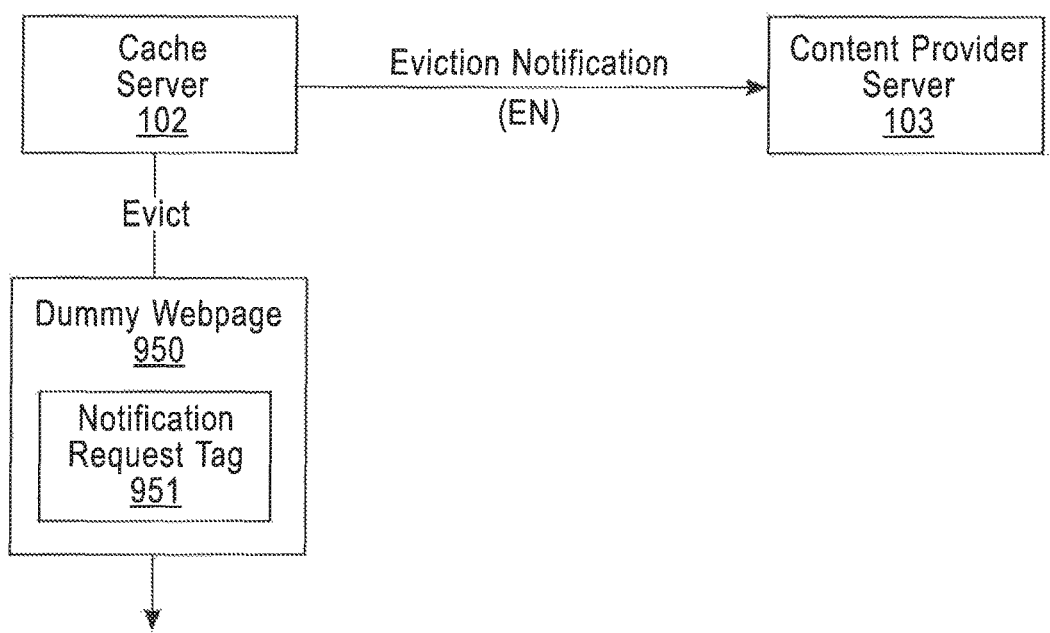

FIGS. 9A and 9B are block diagrams depicting the interaction between a cache server and a content provider server according to the caching management method of FIG. 4, according to an exemplary embodiment of the inventive concept.

Referring to FIGS. 9A and 4 together, during operation 401, a dummy webpage 950 may be embedded with a notification request tag 951. During operation 402, the dummy webpage 950 is uploaded from the content provider server 103 to the cache server 102.

Referring to FIGS. 9B and 4 together, during operation 404, the dummy webpage 950 is evicted from the cache server 102. An eviction notification EN is sent from the cache server 102 to the content provider server 103.

Figure 10A:
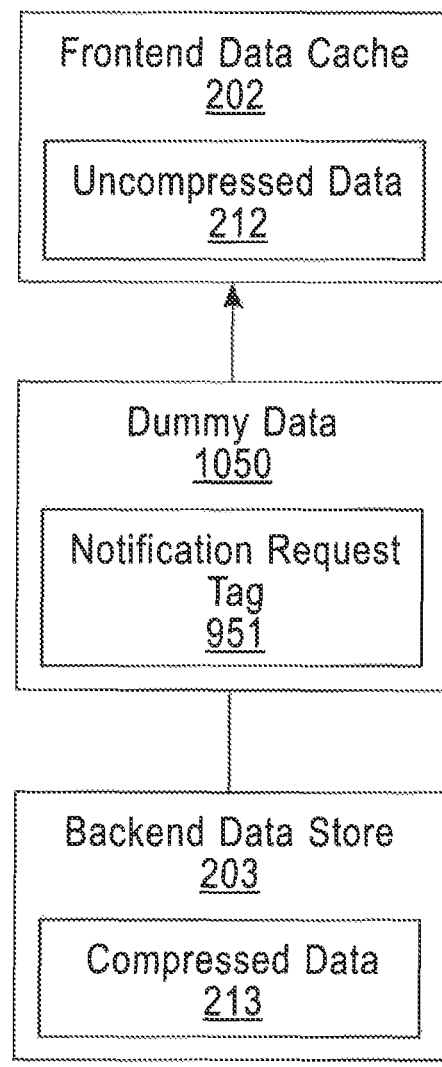
FIGS. 10A and 10B are block diagrams depicting the interaction between a frontend data cache and a backend data store according to the caching management method of FIG. 5, according to an exemplary embodiment of the inventive concept.
Figure 10B:
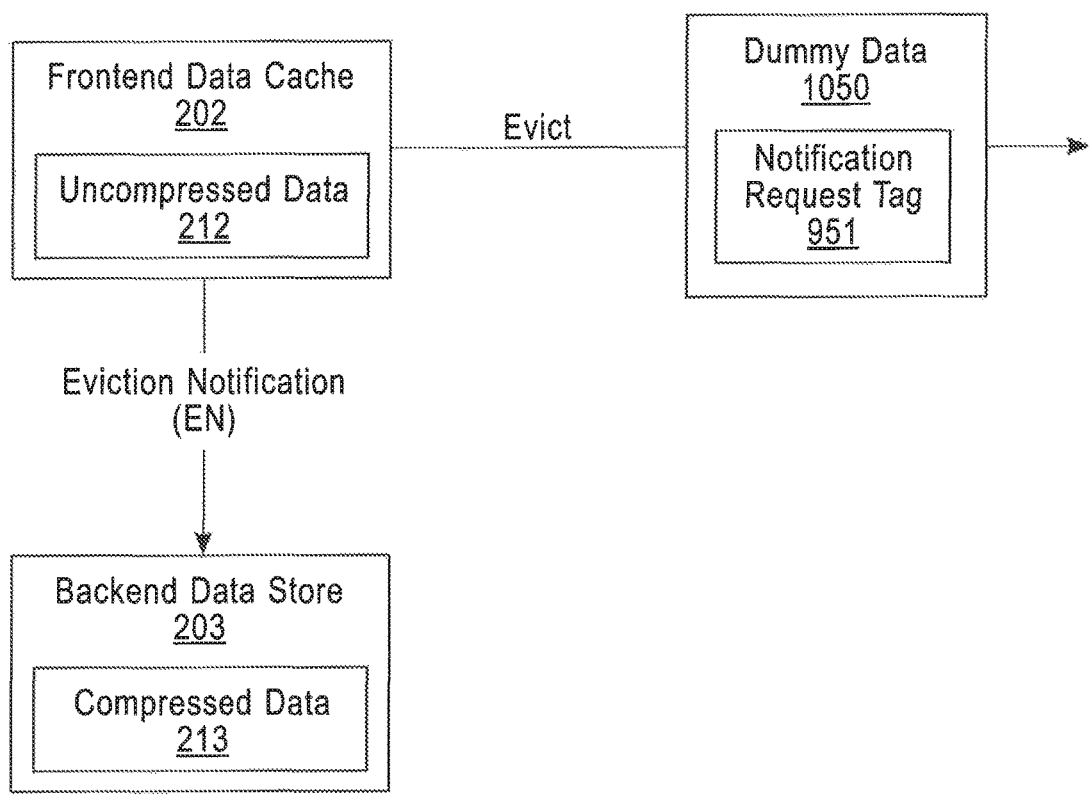

FIGS. 10A and 10B are block diagrams depicting the interaction between a frontend data cache and a backend data store according to the caching management method of FIG. 5, according to an exemplary embodiment of the inventive concept.

Referring to FIGS. 10A and 5 together, during operation 501, dummy data 1050 is embedded with the notification request tag 951. During operation 502, the dummy data 1050 is transmitted from the backend data store 203 to the frontend data cache 202.

Referring to FIGS. 10B and 5 together, during operation 504, the dummy data 1050 is evicted from the frontend data cache. The eviction notification EN is sent from the frontend data cache 202 to the backend data store 203.

Figure 11:
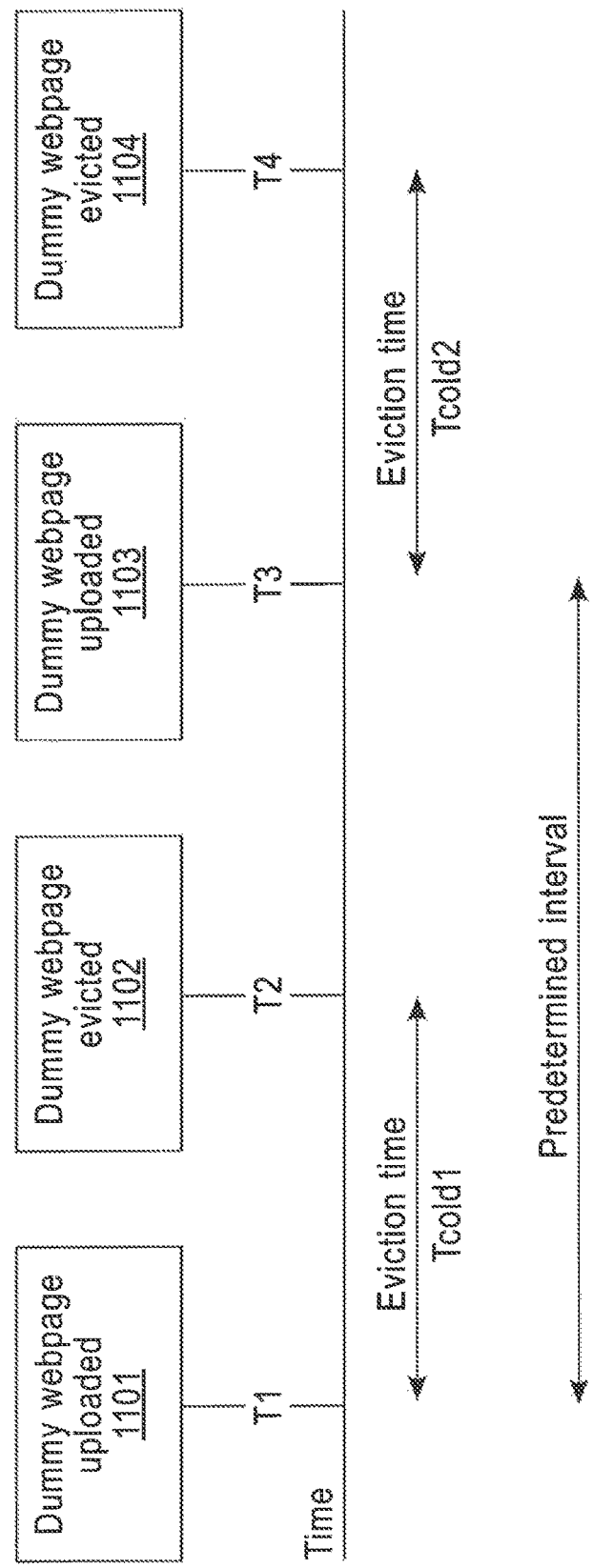
FIG. 11 illustrates a timeline for determining an eviction time of a dummy webpage according to an exemplary embodiment of the inventive concept.

FIG. 11 illustrates a timeline for determining an eviction time of a dummy webpage according to an exemplary embodiment of the inventive concept.

Referring to FIG. 11, the dummy webpage is uploaded to a cache server at a time T1 (operation 1101). The dummy webpage is evicted from the cache server at a time T2 (operation 1102). The difference between T1 and T2 is a first eviction time Tcold1. After a predetermined interval, the dummy webpage is uploaded again at a time T3 (operation 1103). The dummy webpage is evicted again at a time T4 (operation 1104). The difference between T3 and T4 is a second eviction time Tcold2. Tcold1 and Tcold2 may be the same or different. The predetermined interval is a period of time between T1 and T3.

As shown in FIG. 11, operations 1101 and 1102 are repeated in operations 1103 and 1104. This upload/eviction process may continue for an indeterminate amount of time. In other words, the dummy webpage is uploaded to the cache server at the predetermined interval (difference between T1 and T3). The purpose of this is to adjust the eviction time Tcold. Additionally, as discussed above with reference to FIGS. 7 and 8, FREQ_AVG and FREQ_PER are indicated by the eviction notification along with Tcold. Thus, each time the upload/eviction process is repeated, updated values for Tcold, FREQ_AVG, and FREQ_PER, which may have changed due to parameter adjustments, changing access patterns, etc., are received, allowing for optimized caching management.

The timeline shown in FIG. 11 is applicable to dummy data uploaded to and evicted from a frontend data cache, as described herein according to exemplary embodiments of the inventive concept.

The dummy webpage or data may be uploaded at the predetermined interval as described above. However, the inventive concept is not limited thereto and the dummy webpage/data may be uploaded according to other factors. For example, the dummy webpage/data may be uploaded depending on the workload of the cache server or the backend data store, e.g., the dummy webpage/data will be uploaded when the cache server/backend data store has available resources. As another example, the dummy webpage/data may be uploaded immediately after the cache server/backend data store receives the eviction notification.

Figure 12:
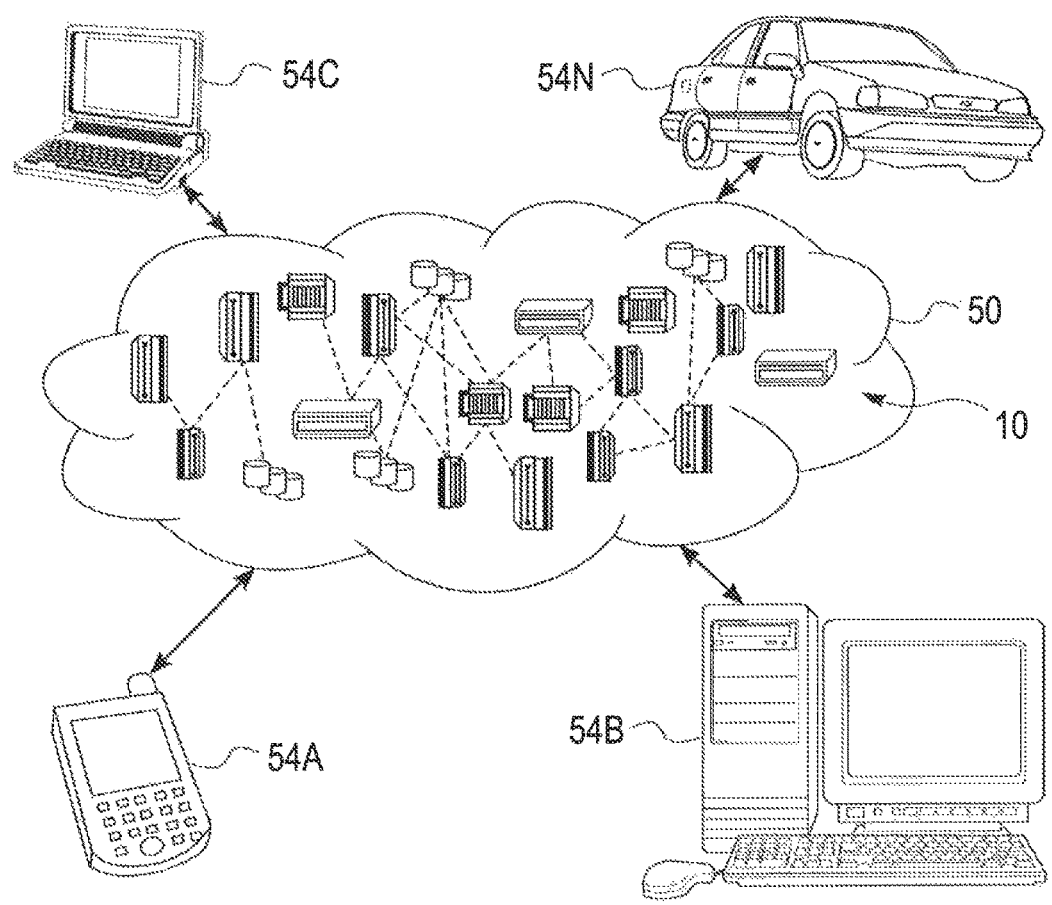
FIG. 12 depicts a cloud computing environment according to an exemplary embodiment of the inventive concept.
Figure 13:
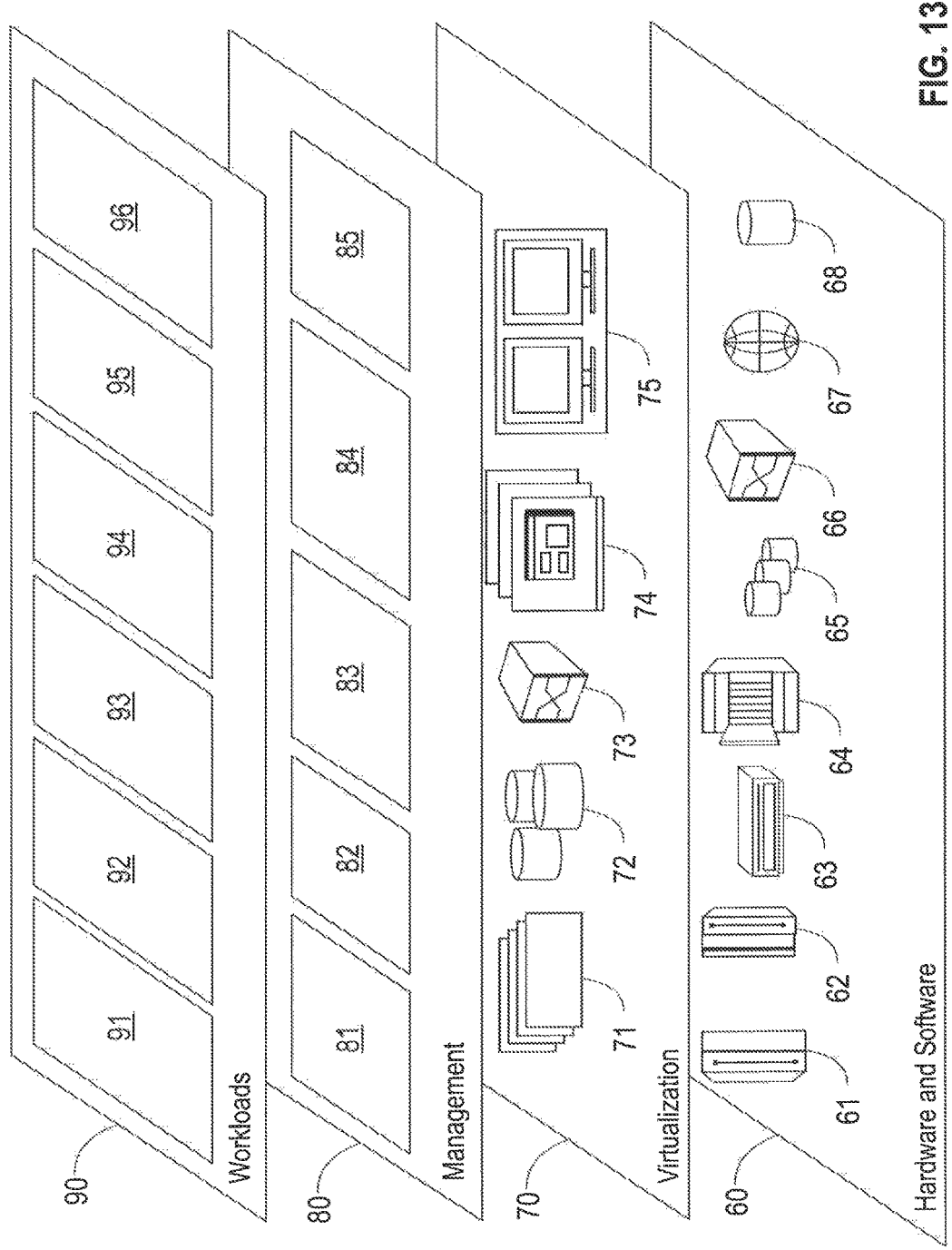
FIG. 13 depicts abstraction model layers according to an exemplary embodiment of the inventive concept.

FIG. 12 depicts a cloud computing environment according to an exemplary embodiment of the inventive concept. FIG. 13 depicts abstraction model layers according to an exemplary embodiment of the inventive concept.

It is understood in advance that although this disclosure includes a detailed description on cloud computing, implementation of the teachings recited herein are not limited to a cloud computing environment. Rather, embodiments of the inventive concept are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a mobile desktop 96.

With respect to the caching management methods and operations described above with reference to FIGS. 4-8, they may be configured at the hardware and software layer 60 or the management layer 80 within the cloud computing environment 50.

Figure 14:
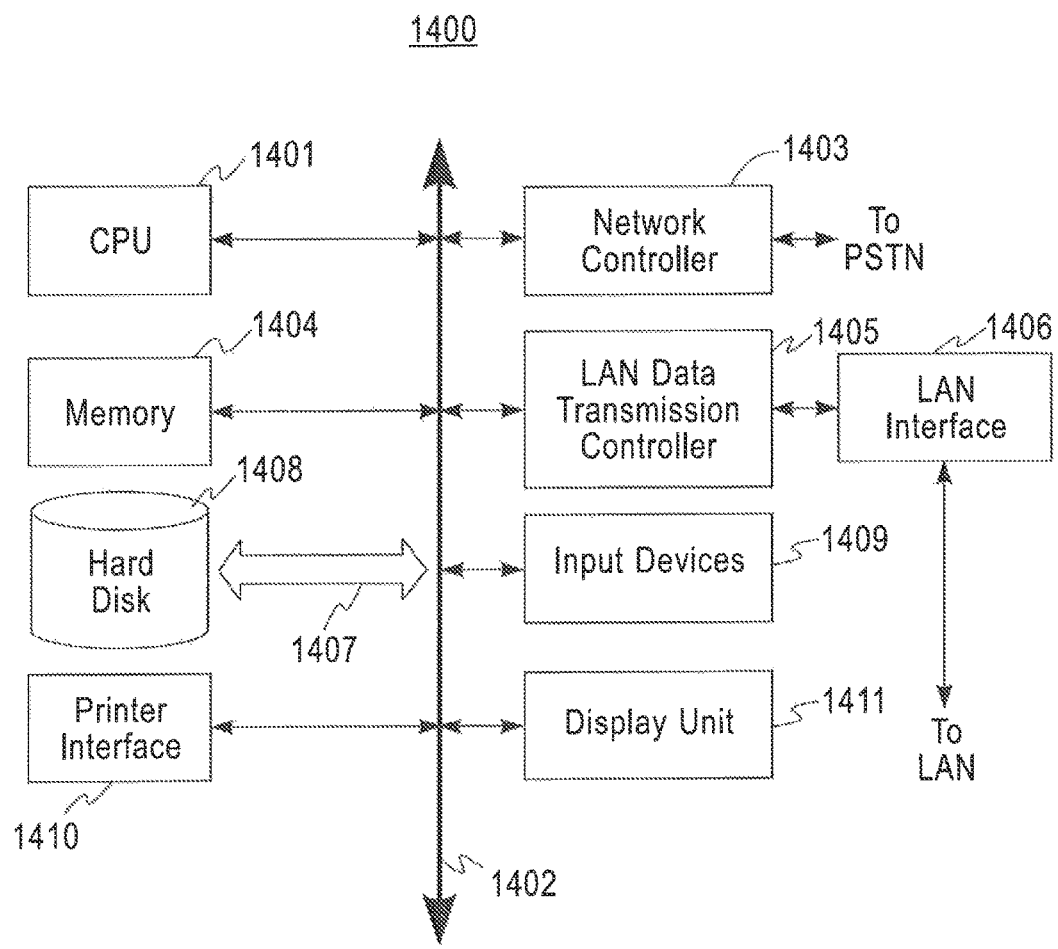
FIG. 14 illustrates an example of a computer system capable of implementing the methods according to exemplary embodiments of the inventive concept.

FIG. 14 illustrates an example of a computer system capable of implementing the methods according to exemplary embodiments of the inventive concept. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1400 may include, for example, a central processing unit (CPU) 1401, random access memory (RAM) 1404, a printer interface 1410, a display unit 1411, a local area network (LAN) data transmission controller 1405, a LAN interface 1406, a network controller 1403, an internal bus 1402, and one or more input devices 1409, for example, a keyboard, mouse etc. As shown, the system 1400 may be connected to a data storage device, for example, a hard disk, 1408 via a link 1407.

Moreover, the inventive concept may be a system, a method, and/or a computer program product at any possible technical detail level of integration. The computer program product may include a computer readable storage medium (or media) having computer readable program instructions thereon for causing a processor to carry out aspects of the inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the inventive concept.

Aspects of the inventive concept are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. See, e.g., FIGS. 4-8.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Through the caching management methods and system described above, lower overhead, better performance, higher system throughput, and lower latency for users may be achieved. Overhead may be simple and low because only a small set of pages (e.g., the dummy webpages) need to be tagged with the notification request tags. Runtime status and usage of CDN cache space can be tracked and measured. The status and usage information can be used to reduce content synchronization traffic, improve provisioning of CDN cache space, etc. The content provider can efficiently manage the cache space provided by the cache server through an intelligent algorithm that allows the content server to predict whether requested content is worth being pushed into the cache server. As such, users may experience better performance and lower latency when requesting content, thereby increasing overall system throughput.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims.

The invention claimed is:
1. A caching management method, comprising:
    embedding a notification request tag as metadata in a dummy file, wherein the notification request tag includes at least one bit;
    uploading the dummy file to a cache server;
    recording a timestamp indicating a first point in time that the dummy file is uploaded to the cache server;
    receiving an eviction notification indicating a second point in time that the dummy file is evicted from the cache server, wherein transmission of the eviction notification is triggered in response to processing the notification request tag, and the dummy file is not retrieved from the cache server between the first point in time and the second point in time; and
    calculating an eviction time indicating an amount of time taken for the dummy file to be evicted from the cache server, wherein the eviction time is equal to a difference between the first point in time and the second point in time.
2. The method of claim 1, further comprising:
    determining an average inter-request time of an actual file, wherein the average inter-request time is equal to an average amount of time that passes between consecutive requests for the actual file;
    comparing the average inter-request time to the eviction time; and uploading the actual file to the cache server when the average inter-request time is smaller than the eviction time.

3. The method of claim 2, wherein the dummy file is a dummy webpage, and the actual file is an actual webpage.

4. The method of claim 2, further comprising:
aborting uploading the actual file to the cache server when the average inter-request time is larger than the eviction time.

5. The method of claim 4, wherein the dummy file is uploaded to the cache server by a content provider server, the eviction notification is transmitted to the content provider server by the cache server in response to the cache server processing the notification request tag, the average inter-request time is determined by the content provider server, the average inter-request time is compared to the eviction time by the content provider server, uploading the actual file to the cache server is performed by the content provider server, and aborting uploading the actual file to the cache server is performed by the content provider server.

6. The method of claim 1, further comprising:
determining an average inter-request time of an actual file, wherein the average inter-request time is equal to an average amount of time that passes between consecutive requests for the actual file;
comparing the average inter-request time to an average request frequency of all files stored in the cache server, wherein the average request frequency is indicated by the eviction notification; and
uploading the actual file to the cache server when the average inter-request time is within a predetermined deviation range of the average request frequency.

7. The method of claim 6, further comprising:
aborting uploading the actual file to the cache server when the average inter-request time is not within the predetermined deviation range of the average request frequency.

8. The method of claim 7, wherein the dummy file is uploaded to the cache server by a content provider server, the eviction notification is transmitted to the content provider server by the cache server in response to the cache server processing the notification request tag, the average inter-request time is determined by the content provider server, the average inter-request time is compared to the average request frequency by the content provider server, uploading the actual file to the cache server is performed by the content provider server, and aborting uploading the actual file to the cache server is performed by the content provider server.

9. The method of claim 1, further comprising:
determining an average inter-request time of an actual file, wherein the average inter-request time is equal to an average amount of time that passes between consecutive requests for the actual file;
comparing the average inter-request time to an average request frequency of files stored in the cache server that are at a predetermined percentile of all files stored in the cache server with relation to access frequency, wherein the average request frequency is indicated by the eviction notification; and
uploading the actual file to the cache server when the average inter-request time is within a predetermined deviation range of the average request frequency.

10. The method of claim 9, further comprising:
aborting uploading the actual file to the cache server when the average inter-request time is not within the predetermined deviation range of the average request frequency.

11. The method of claim 1, wherein the dummy file is periodically uploaded to the cache server at a predetermined interval.

12. A caching management method, comprising:
embedding a notification request tag metadata in dummy data, wherein the notification request tag includes at least one bit;
transmitting the dummy data from a backend data store to a frontend data cache, wherein the backend data store stores compressed data and the frontend data cache stores uncompressed data;
recording a timestamp indicating a first point in time that the dummy data is transmitted to the frontend data cache;
receiving an eviction notification indicating a second point in time that the dummy data is evicted from the frontend data cache, wherein transmission of the eviction notification is triggered in response to processing the notification request tag, and the dummy data is not retrieved from the frontend data cache between the first point in time and the second point in time; and
calculating an eviction time indicating an amount of time taken for the dummy data to be evicted from the frontend data cache, wherein the eviction time is equal to a difference between the first point in time and the second point in time.

13. The method of claim 12, further comprising:
determining an average inter-request time of actual data, wherein the average inter-request time is equal to an average amount of time that passes between consecutive requests for the actual data;
comparing the average inter-request time to the eviction time; and
transmitting the actual data to the frontend data cache when the average inter-request time is smaller than the eviction time.

14. The method of claim 13, further comprising:
aborting transmitting the actual data to the frontend data cache when the average inter-request time is larger than the eviction time.

15. The method of claim 12, further comprising:
determining an average inter-request time of actual data, wherein the average inter-request time is equal to an average amount of time that passes between consecutive requests for the actual data;
comparing the average inter-request time to an average request frequency of all data stored in the frontend data cache, wherein the average request frequency is indicated by the eviction notification; and
transmitting the actual data to the frontend data cache when the average inter-request time is within a predetermined deviation range of the average request frequency.

16. The method of claim 15, further comprising:
aborting transmitting the actual data to the frontend data cache when the average inter-request time is not within the predetermined deviation range of the average request frequency.

17. The method of claim 12, further comprising:
determining an average inter-request time of actual data, wherein the average inter-request time is equal to an average amount of time that passes between consecutive requests for the actual data;

comparing the average inter-request time to an average request frequency of data stored in the frontend data cache that is at a predetermined percentile of all data stored in the frontend data cache with relation to access frequency, wherein the average request frequency is indicated by the eviction notification; and transmitting the actual data to the frontend data cache when the average inter-request time is within a predetermined deviation range of the average request frequency.

18. The method of claim 17, further comprising:

aborting transmitting the actual data to the frontend data cache when the average inter-request time is not within the predetermined deviation range of the average request frequency.

19. The method of claim 12, wherein the dummy data is periodically transmitted to the frontend data cache at a predetermined interval.

20. A caching management system, comprising:

a backend data store configured to store compressed data;

a frontend data cache configured to store uncompressed data, wherein the frontend data cache is operatively coupled to the backend data store;

a memory storing a computer program; and a processor configured to execute the computer program, wherein the computer program is configured to:

embed a notification request tag as metadata in dummy data, wherein the notification request tag includes at least one bit;

transmit the dummy data from the backend data store to the frontend data cache;

record a timestamp indicating a first point in time that the dummy data is transmitted to the frontend data cache;

transmit an eviction notification indicating a second point in time that the dummy data is evicted from the frontend data cache, wherein transmission of the eviction notification is triggered in response to processing the notification request tag, and the dummy data is not retrieved from the frontend data cache between the first point in time and the second point in time; and calculate an eviction time indicating an amount of time taken for the dummy data to be evicted from the frontend data cache, wherein the eviction time is equal to a difference between the first point in time and the second point in time.

\* \* \* \* \*